(12) United States Patent
Jellá

(10) Patent No.: US 6,586,085 B1
(45) Date of Patent: Jul. 1, 2003

(54) WOOD OVERLAY SECTION FOR CARRIAGE HOUSE DOOR AND METHOD OF MAKING SAME

(75) Inventor: John F. Jellá, Tempe, AZ (US)

(73) Assignee: 1st United Door Technologies, Inc., Tempe, AZ (US)

( * ) Notice: Subject to any disclaimer, the term of this patent is extended or adjusted under 35 U.S.C. 154(b) by 40 days.

(21) Appl. No.: 09/792,545

(22) Filed: Feb. 22, 2001

(51) Int. Cl.[7] ............................... B32B 3/26; E04C 1/00
(52) U.S. Cl. ...................... 428/319.1; 52/309.9; 52/364; 52/396.04; 52/586.2; 52/590.1; 52/800.1; 52/802.1; 52/592.1; 52/592.3; 160/201
(58) Field of Search ..................... 428/319.1; 52/309.9, 52/396.04, 586.2, 590.1, 800.1, 802.1, 592.1, 592.3, 364; 160/201

(56) References Cited

U.S. PATENT DOCUMENTS

| | | | | |
|---|---|---|---|---|
| 4,095,913 A | * | 6/1978 | Pettersson et al. | 403/396 |
| 5,373,678 A | * | 12/1994 | Hesser | 52/592.1 |
| 5,438,808 A | * | 8/1995 | Costello | 52/316 |
| 5,509,457 A | * | 4/1996 | Jella | 160/201 |
| 5,533,312 A | * | 7/1996 | Mihalcheon | 52/309.9 |
| 5,711,125 A | * | 1/1998 | Schooling | 52/457 |
| 5,737,802 A | | 4/1998 | Jellá | 16/93 R |
| 6,148,896 A | | 11/2000 | Pinto et al. | 160/229 |

* cited by examiner

Primary Examiner—Terrel Morris
Assistant Examiner—Hai Vo
(74) Attorney, Agent, or Firm—Jordan M. Meschkow; Lowell W. Gresham; Charlene R. Jacobsen

(57) ABSTRACT

A carriage house garage door (20) is formed from first, second, and third wood overlay sections (22, 24, 26). Each of the wood overlay sections (22, 24, and 26) includes first and second layers of sheet metal (46, 48) and an insulating core (50). The first layer of sheet metal (46) is bonded to a first side (52) of the insulating core (50) and the second layer of sheet metal (48) is bonded to the second side (54) of the insulating core (50). Wood siding (30) is coupled to the first layer of sheet metal (46) by bonding the wood siding (30) to the first layer (46) using an adhesive and by stapling the wood siding (30) to the first layer (46).

15 Claims, 3 Drawing Sheets

WOOD OVERLAY SECTION FOR CARRIAGE HOUSE DOOR AND METHOD OF MAKING SAME

TECHNICAL FIELD OF THE INVENTION

The present invention relates to the field of garage doors. More specifically, the present invention relates to wood overlay sectional carriage house garage doors.

BACKGROUND OF THE INVENTION

A typical overhead garage door is constructed from a plurality of door sections, which are hinged together and supported from a track system with rollers attached to opposite ends of the door sections. The rollers generally allow the door to be moved from a vertically oriented closed position to a substantially horizontal open position. Electrically powered garage door openers are often used with the overhead garage door so that a driver may conveniently open and close the door from within a vehicle.

With regard to residential applications, an overhead garage door is generally either eight or sixteen feet wide. Typically, such a door includes four horizontally oriented sections, each of which is about eight or sixteen feet long and twenty-one inches high. For example, a single car residential garage may have an eight foot wide by seven foot high door. Likewise, a two car residential garage may have a single sixteen foot wide door by seven foot high door or two eight foot wide by seven foot high doors.

Some of the first doors made for garages were one piece barn doors that operated as large swinging or sliding doors. The nostalgic design of these doors is replicated in a sectional carriage house door. A sectional carriage house door functions like a typical overhead garage door in that it moves on a track and roller system to open and close the door. However, the appearance of the sectional carriage house door simulates the historic swing type doors used in early automobile shelters. These carriage house garage doors are particularly desirable for use with older homes to maintain the historic design of the home while gaining the convenience of the conventional overhead garage door. Carriage house garage doors are also desirable with newer homes for enhancing the overall appearance of the garage and consequently the house.

Sectional carriage house garage doors have been manufactured for many years with various types of wood siding applied over the door sections. By convention, one by six tongue and groove cedar or redwood boards and/or exterior woodsman siding are applied to a 1.375 or 1.75 inch thick wood flush door section or to a wood open frame door section. The wood siding material is laid out over the door section and stapled to the flush door section or open frame door section.

More recently, manufacturers have been applying the siding to a steel open frame garage door section. This is performed by laying the siding on the floor in a manner that creates the final carriage house door design. The steel open frame door section is then attached to the siding with screws. Once the steel door sections have been secured to the siding, the entire door is cut into sections. Polyvinylchloride (PVC) insulation is then added to the core of the steel frame door sections to cover the screws.

Unfortunately, both the wood and steel door applications have numerous problems. These problems are caused by the weight of the wood overlay, which typically adds one hundred to two hundred pounds to the overall weight of the sectional carriage house door. In particular, the wood frame door section and the steel frame door section often lack the structural integrity or the strength to adequately support the added weight of the wood siding. Thus, the carriage house door has a limited life.

In addition, the heavy prior art carriage house door requires reinforced hardware to support this added weight. Furthermore, the thickness of the door increases relative to the thickness of the wood siding, thus creating additional framing, and again, hardware problems. Many manufacturers do not understand the problems incurred with the added weight, and consequently supply the consumer with hardware that is insufficient for supporting the door. This could lead to an inconvenient situation in which the door repeatedly falls out of the door tracks. Moreover, the hardware components, such as the rollers, connection points, springs, or the tracks themselves could fail causing property damage and/or injury.

In addition to the mechanical problems caused by the excessive weight of the sectional carriage house door, the sectional carriage house door suffers from problems associated with aesthetic appearance. In particular, the use of four twenty-one inch horizontally oriented sections to form the carriage house door results in three horizontal lines created at the section joints. These horizontal lines at the section joints detract from the appearance of the door, which is contrary to the objectives of maintaining the historic design and enhancing the overall appearance of the garage.

SUMMARY OF THE INVENTION

Accordingly, it is an advantage of the present invention that a wood overlay section for a carriage house garage door is provided.

It is another advantage of the present invention that a wood overlay section is provided to form a carriage house garage door that is relatively lightweight and structurally sound.

It is yet another advantage of the present invention that the wood overlay section is provided to form an aesthetically pleasing carriage house door.

The above and other advantages of the present invention are carried out in one form by a wood overlay section for a carriage house garage door. The wood overlay section has a section substructure including a first layer of sheet metal, a second layer of sheet metal, and an insulating core having first and second sides. The first layer of sheet metal is coupled to the first side of the insulating core, and the second layer of sheet metal is coupled to the second side of said insulating core. Wood siding is coupled to the first layer of sheet metal by bonding the wood siding to the first layer using an adhesive and by stapling the wood siding to the first layer.

The above and other advantages of the present invention are carried out in another form by a wood overlay carriage house garage door. The wood overlay carriage house garage door includes first, second, and third wood overlay sections each having a height of substantially twenty-eight inches. Each of the first, second, and third wood overlay sections has a section substructure including a first layer of sheet metal, a second layer of sheet metal, and an insulating core having first and second sides. The first layer of sheet metal is coupled to the first side of the first insulating core, and the second layer of sheet metal is coupled to the second side of the first insulating core. Wood siding is coupled to the first layer of sheet metal by bonding the wood siding to the first layer using an adhesive and by stapling the wood siding to the first layer. The first, second, and third wood overlay sections function cooperatively to yield an overall height of the carriage house garage door of substantially eighty-four inches.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
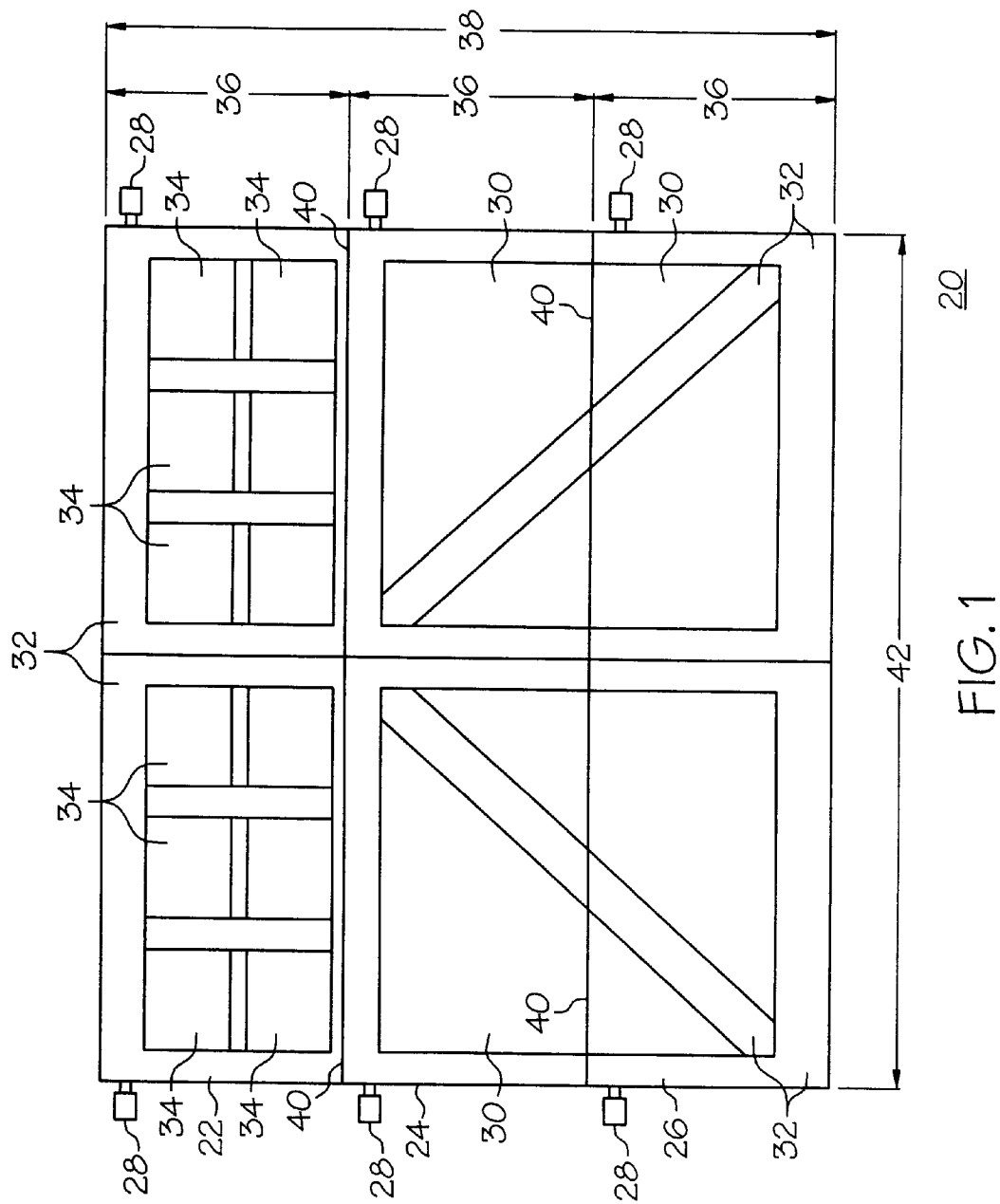
FIG. 1 shows a front view of a wood overlay carriage house garage door in accordance with a preferred embodiment of the present invention.

FIG. 1 shows a front view of a wood overlay carriage house garage door 20 in accordance with a preferred embodiment of the present invention. Carriage house garage door 20 is an overhead sectional garage door having first, second, and third wood overlay door sections 22, 24, and 26, respectively, that are hinged together.

Guide members 28, attached to opposite ends of each of first, second, and third sections 22, 24, and 26, allow door 20 to be moved from a vertically oriented closed position to a substantially horizontal open position along a track system (not shown) coupled to a garage (not shown). One exemplary track system including guide members 28 is described in "Door Track", by John F. Jellá U.S. Pat. No. 5,737,802, issued Apr. 14, 1998, and incorporated by reference herein.

Wood overlay carriage house garage door 20 simulates the historic swing type doors used in early automobile shelters. For example, carriage house garage door 20 includes wood siding 30 with trim boards 32 attached to and arranged in a pattern over wood siding 30. First wood overlay section 22 of door 20 also includes windows 34 to further enhance the aesthetic appearance of door 20.

The pattern of trim boards 32 over wood siding 30, known as a half-buck pattern, and the inclusion of windows 34 in carriage house garage door 20 represents one configuration of carriage house garage door 20. It should be apparent to those skilled in the art, that trim boards 32 and/or windows 34 may be arranged differently than what is shown in FIG. 1 to obtain a desired style for carriage house garage door 20. For example, trim boards 32 may be arranged in a crossbuck pattern, perimeter pattern, vertical pattern, horizontal pattern, and so forth, while windows 34 may be smaller, larger, include curve tops, and so forth.

In a preferred embodiment, carriage house garage door 20 is manufactured from three wood overlay sections, i.e., first, second, and third wood overlay sections 22, 24, and 26, each having a height 36 of substantially twenty-eight inches. Thus, first, second, and third wood overlay sections 22, 24, and 26 function cooperatively to yield an overall height 38 of substantially eight-four inches, or seven feet. A total of three wood overlay sections advantageously decreases a number section joints from three, created by the four sections of conventional overhead doors, to only two section joints 40 created by the three wood overlay sections 22, 24, and 26 of garage door 20. The two section joints 40 of garage door 20 are less conspicuous than the three section joints of a conventional overhead garage door thereby effectively enhancing the appearance of carriage house garage door over conventional sectional carriage house garage doors.

In the illustrative embodiment of FIG. 1, each of first, second, and third wood overlay sections 22, 24, and 26, respectively, has a width 42 of approximately ninety-six inches, or eight feet. Thus, garage door 20 is sized to fit a conventional single-car residential garage door opening of eight feet wide by seven feet high. Alternatively, garage door 20 may be adapted to fit a two car residential garage having a single sixteen foot wide by seven foot high opening, or another conventional or custom dimensioned garage door opening.

Figure 2:
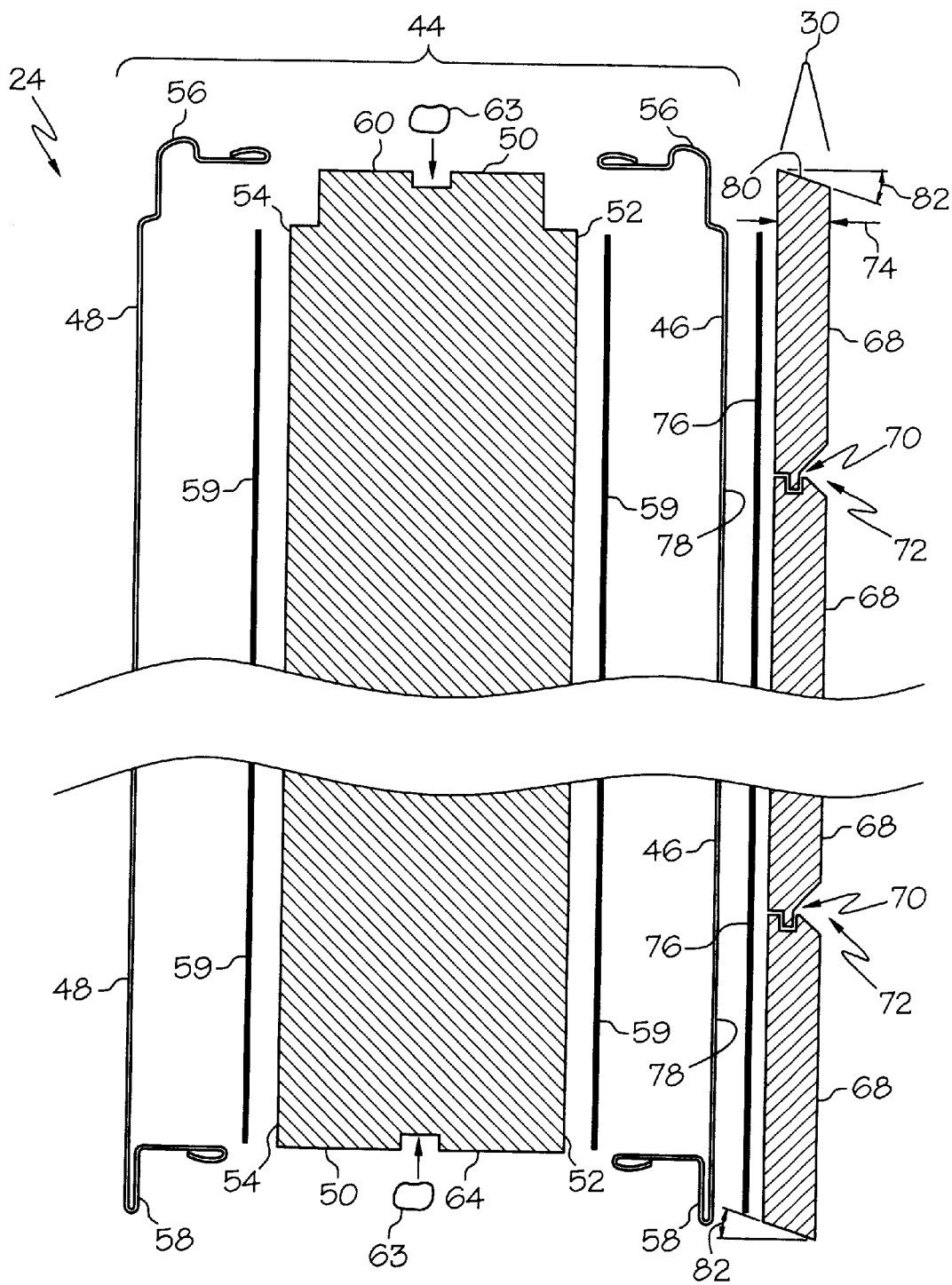
FIG. 2 shows a partial, exploded side view of a wood overlay section of the carriage house garage door of FIG. 1.

FIG. 2 shows a partial, exploded side view of second wood overlay section 24 of carriage house garage door 20 (FIG. 1). The structure of second wood overlay section 24 is described for clarity of illustration. However, it should be understood that first and third wood overlay sections 22 and 26, respectively, are fabricated in a similar manner. The differences between first, second, and third wood overlay sections 22, 24, and 26 are the absence or presence of windows 34 (FIG. 1) and/or the pattern of trim boards 32 (FIG. 1). Consequently, the following description of the structure of second overlay section 24 applies to first and third wood overlay sections 22 and 26 as well.

Second wood overlay section 24 includes a section substructure 44 and wood siding 30. Section substructure 44 includes a first layer of sheet metal 46, a second layer of sheet metal 48, and an insulating core 50 having first and second sides 52 and 54, respectively. In a preferred embodiment, first and second layers of sheet metal 46 and 48, respectively, are formed from twenty-five or twenty-six gauge steel. Although twenty-five or twenty-six gauge steel is preferred, it should be apparent to those skilled in the art that other widths of steel may be utilized. Alternatively, other metals, such as aluminum, formed into sheets may be utilized.

First layer of sheet metal 46 includes a tongue portion 56 and a groove portion 58 located on opposing edges of first layer of sheet metal 46. Likewise, second layer of sheet metal 48 includes tongue portion 56 and groove portion 58 located on opposing edges of second layer of sheet metal 48. Tongue and groove portions 56 and 58, respectively, are fabricated on first and second layers of sheet metal 46 and 48, respectively, by roll forming.

Roll forming is a progressive process in which first and second layers of sheet metal 46 and 48 are shaped by a series of rolls. Each shape will have a different set of rolls, and each roll slightly changes the shape of the sheet metal. When the sheet metal reaches the end of the line, the desired shape is achieved. Roll forming produces high quality products quickly and inexpensively compared to traditional press operations and is desirable for producing long shapes.

Insulating core 50 is formed from polystyrene foam board insulation. A density of polystyrene foam board insulating core 50 is approximately two pounds per cubic foot. Accordingly, polystyrene foam board insulating core 50 is known as two-pound-density expanded polystyrene (EPS) foam insulation. Insulating core 50 of two-pound-density EPS is desirable due to the thermal performance and structural rigidity of two-pound-density EPS. Although twopound-density EPS is preferred, it should be apparent to those skilled in the art that other insulating materials may be used. For example, other densities of EPS, polyurethane, and polyisocyanurate are available as rigid foam boards having effective thermal performance.

Section substructure 44 is fabricated by coupling first layer of sheet metal 46 to first side 52 of insulating core 50 using an adhesive 59. Likewise, second layer of sheet metal 48 is coupled to second side 54 of insulating core 50 using adhesive 59. In a preferred embodiment, adhesive 59 is a hot melt polyurethane reactive (PUR) adhesive. Hot melt PUR adhesive is preferred because it may be applied to a substrate as a dot or as a thin glue line, rather than using a slot die or roll coater. In addition, PUR adhesive sets in seconds and is structurally rigid in minutes following a final set. Although hot melt PUR adhesive is preferred, it should be apparent to those skilled in the art, that other adhesives may be used in place of hot melt PUR adhesive that have these similar properties.

Figure 3:
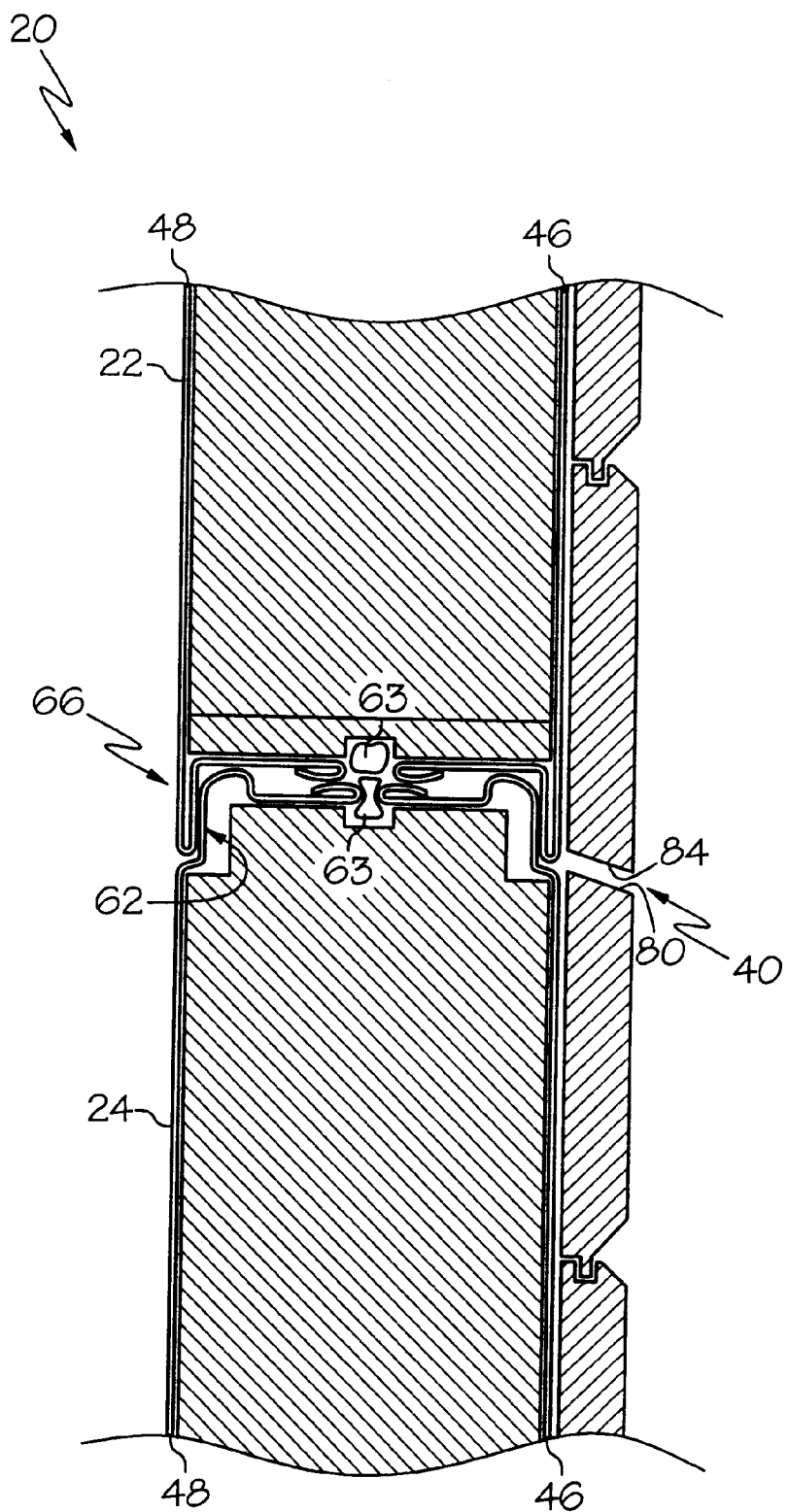
FIG. 3 shows a side view of a section joint between two wood overlay sections of the carriage house garage door of FIG. 1.

Following adhesion of first and second layers of sheet metal 46 and 48, respectively to insulating core 50, tongue portions 56 of first and second layers of sheet metal 46 and 48 are located along a first edge 60 of insulating core 50 to form a section tongue 62 (FIG. 3). A sealant 63 is applied at first edge 60 of insulating core 50 at a junction between tongue portions 56 of each of first and second layers of sheet metal 46 and 48. Sealant-63 creates a moisture resistant barrier for insulating core 50 at section tongue 62. Likewise, groove portions 58 of first and second layers of sheet metal 46 and 48 are located along a second edge 64 of insulating core 50 to form a section groove 66 (FIG. 3). Sealant 63 is also applied at second edge 64 at the junction between groove portions 58 of first and second layers of sheet metal 46 and 48 to create a moisture resistant barrier for insulating core 50 at section groove 66. Section tongue 62 and section groove 66 will be discussed in further detail in connection with FIG. 3.

After first and second layers of sheet metal 46 and 48, respectively have bonded to insulating core 50, end members (not shown) are coupled to each end of section substructure 44. Guide members 28 (FIG. 1), or rollers, will ultimately be coupled to these end members. The sandwich construction of section substructure 44, i.e., first and second layers of sheet metal 46 and 48 bonded to insulating core 50, provides a rigid framework upon which to bond wood siding 30.

Wood siding 30 is formed from a plurality of wood panels 68 having tongue and groove joints 70 interlocking wood panels 68. In a preferred embodiment, wood panels 68 are V-groove wood panels having a V-shape channel 72 at each interlocked tongue and groove joints 70. Prior to coupling wood panels 68 to section substructure 44, wood panels 68 are treated on all sides and edges with a wood sealer and preservative to protect wood panels 68 from the elements, such as sun, rain, and snow.

In a preferred embodiment, wood siding 30 has a thickness 74 in a range of 0.2 to 0.4 inches. Thus, thickness 74 of wood siding 30 is approximately one half of the thickness of the traditionally used 0.75 to 1 inch wood siding. This reduced thickness 74 of wood siding 30 from the traditionally utilized wood siding advantageously reduces the weight of the wood being applied to section substructure 44 in half over traditional wood overlay carriage house doors. In addition, thickness 74 causes wood siding 30 to be more flexible than the traditional 0.75 to 1 inch wood siding, thereby avoiding the cupping and crowning that occurs on the thicker 0.75 to 1 inch wood siding.

Fabrication of carriage house garage door 20 entails arranging section substructures 44 for each of first, second, and third wood overlay sections 22, 24, and 26, respectively, to obtain overall height 38 (FIG. 1) of carriage house garage door 20 (FIG. 1). In particular, three section substructures 44 are placed into a wooden floor clamp and spacers are positioned between each of section substructures 44. Section substructures 44 are then clamped together to ensure that section substructures 44 will not move during the installation of wood siding 30. The spacers, for example, one-eighth inch spacers, allow for the thickness of the cut of a saw blade when first, second, and third wood overlay sections 22, 24, and 26 are separated (discussed below).

Once section substructures 44 are clamped together, an adhesive 76 is applied to a face 78 of first layer of sheet metal 46. In a preferred embodiment, adhesive 76 is SB-190 Everseal, manufactured by Surebond, Inc., Schaumberg, Ill. SB-190 Everseal is preferred because it provides effective tensile and impact strength, and securely adheres to most rigid materials.

Following the application of adhesive 76 to first layer of sheet metal 46 on each of section substructures 44, wood panels 68 are interlocked to one another using tongue and groove joints 70 and coupled to first layer of sheet metal 46 by bonding wood panels 68 using adhesive 76. Adhesive 76, such as SB-190 Everseal, provides secure adhesion of wood siding 30 to first layer of sheet metal 46. Once wood panels 68 are bonded to first layer of sheet metal 46, wood panels 68 are stapled to section substructures using brad nails. The brad nails penetrate the wood and first layer of sheet metal to further secure wood siding to section substructures 44. Brad nails are desirable for providing a secure coupling. However, it should be apparent to those skilled in the art that other types of nails, screws, or staples may be utilized to provide a secure coupling of wood siding 30 to first layer of sheet metal 46.

Following the coupling the interconnected wood panels 68 to section substructures 44, first, second, and third wood overlay sections 22, 24, and 26 are fixed to one another. That is, carriage house garage door 20 (FIG. 1) is a single, or one piece, unit. Consequently, a next operation in the fabrication process of carriage house garage door 20 is to separate each of first, second, and third wood overlay sections 22, 24, and 26. Separation is accomplished by sawing through wood panels 68 of wood siding 30 along a border between section substructures 44 of first, second, and third wood overlay sections 22, 24, and 26 to form section joints 40 (FIG. 1).

In a preferred embodiment, a top edge 80 of each of first, second, and third wood overlay sections 22, 24, and 26 is cut at an approximately fifteen degree downward directed angle 82. Angle 82 allows water to run off first, second, and third sections 22, 24, and 26 at section joints 40 when carriage house door 20 (FIG. 1) is in the vertically oriented closed position.

After first, second, and third sections 22, 24, and 26 have been separated from one another, each are compressed in a horizontal press to ensure bonding of adhesive 76 across width 42 (FIG. 1) and height 36 of each of sections 22, 24, and 26. This compression further enhances the rigidity of each of sections 22, 24, and 26, and consequently the entire carriage house garage door 20 (FIG. 1).

Following the fabrication of first, second, and third wood overlay sections 22, 24, and 26, trim boards 32 (FIG. 1) may be attached to sections 22, 24, and 26 in the desired pattern, such as the half-buck pattern illustrated in FIG. 1. Likewise, openings may be cut and window framing and windows 34

(FIG. 1) may be installed into the openings. Of course, it should be apparent to those skilled in the art that trim boards 32 may be attached to sections 22, 24, and 26, openings may be cut, and windows 34 may be installed at other appropriate times during the fabrication of door 20.

Finally, the door hardware is installed onto first, second, and third wood overlay sections 22, 24, and 26. The door hardware includes, for example, hinges (not shown) connecting first, second, and third wood overlay sections 22, 24, and 26, guide members 28 (FIG. 1), weather stripping, brackets, slide locks, and so forth.

FIG. 3 shows a side view of one of section joints 40 between first wood overlay section 22 and second wood overlay section 24 of carriage house garage door 20. As shown, section tongue 62 of second wood overlay section 24 mates with section groove 66 of first wood overlay section 22. Although not shown, section groove 66 of second wood overlay section 24 mates with section tongue 62 of third wood overlay section 26, in the same manner. In addition, sealant 63 seals sections 22 and 24 at the junctions of first and second layers of sheet metal 46 and 48, respectively.

As further shown in FIG. 3, top edge 80, cut at angle 82 (FIG. 2) of second wood overlay section 24 mates with a bottom edge 84 of first wood overlay section 22. Accordingly, the combination of the mating of section tongue 62 with section groove 66, the addition of sealant 63, and the mating of top and bottom edges 80 and 84, respectively, results in section joints 40 that are resistant to moisture and aesthetically pleasing in appearance.

In summary, the present invention teaches of a wood overlay section for a carriage house garage door and a process of fabricating the wood overlay section and the carriage house door. The sandwich construction of the section substructure of each wood overlay section provides a rigid, structurally sound framework for supporting the wood siding of the carriage house garage door. In addition, the wood siding is significantly thinner than conventionally used wood siding, thereby gaining the advantage of a relatively lightweight carriage house garage door that may be installed by a single installer. The structural integrity of the section substructures combined with the thin wood siding precludes the necessity for customized, reinforced door hardware. Furthermore, the carriage house garage door formed from three wood overlay sections, combined with the tongue and groove construction and angle cut edges of the sections at the section joints, results in an aesthetically pleasing appearance of the carriage house garage door.

Although the preferred embodiments of the invention have been illustrated and described in detail, it will be readily apparent to those skilled in the art that various modifications may be made therein without departing from the spirit of the invention or from the scope of the appended claims. For example, the section substructures and wood siding may be adapted for use in a four section carriage house garage door, rather than the three section carriage house garage door described herein. In addition, a different joint configuration that joins the wood overlay sections may be substituted for the section tongue and section groove configuration described herein.

What is claimed is:

1. A wood overlay section for a carriage house garage door comprising:
    a section substructure including:
        a first layer of sheet metal having a tongue portion and a groove portion located on opposing edges of said first layer of sheet metal;
        a second layer of sheet metal having said tongue portion and said groove portion located on opposing edges of said second layer of sheet metal, said tongue portions of said first and second layers being located along a first edge of said insulating core to form a section tongue on said wood overlay section, and said groove portions of said first and second layers being located along a second edge of said insulating core to form a section groove on said wood overlay section; and
        an insulating core having first and second sides, said first layer of sheet metal being coupled to said first side of said insulating core, and said second layer of sheet metal being coupled to said second side of said insulating core; and
    wood siding coupled to said first layer of sheet metal by bonding said wood siding to said first layer using an adhesive and by stapling said wood siding to said first layer, said wood siding having a thickness in a range of 0.2 to 0.4 inches.

2. A wood overlay section as claimed in claim 1 wherein said insulating core is formed from polystyrene foam board insulation.

3. A wood overlay section as claimed in claim 2 wherein a density of said polystyrene foam board insulation is approximately two pounds per cubic foot.

4. A wood overlay section as claimed in claim 1 wherein:
    said first layer of sheet metal is bonded to said first side of said insulating core using an adhesive; and
    said second layer of sheet metal is bonded to said second side of said insulating core using said adhesive.

5. A wood overlay section as claimed in claim 4 wherein said adhesive is a hot melt polyurethane adhesive.

6. A wood overlay section as claimed in claim 1 wherein said tongue and groove sections of said first and second layers of said sheet metal are fabricated by roll forming said first and second layers of said sheet metal.

7. A wood overlay section as claimed in claim 1 further comprising a sealant for bonding a first junction between said tongue portions of said first and second layers of said sheet metal at said first edge of said insulating core and for bonding a second junction between said groove portions of said first and second layers of said sheet metal at said second edge of said insulating core.

8. A wood overlay section as claimed in claim 1 wherein:
    said section tongue is configured to mate with a second section groove of a second wood overlay section of said carriage house garage door; and
    said section groove is configured to mate with a second section tongue of a third wood overlay section of said carriage house garage door.

9. A wood overlay section as claimed in claim 1 wherein said wood siding is formed from a plurality of wood panels having tongue and groove joints to interlock said wood panels.

10. A wood overlay section as claimed in claim 9 wherein said wood panels are V-groove wood panels.

11. A wood overlay section as claimed in claim 1 wherein bonding of said wood siding to said first layer of said sheet metal is ensured by compressing said wood overlay section in a press subsequent to coupling said wood siding to said first layer.

12. A wood overlay section as claimed in claim 1 wherein said wood siding includes an angle cut top edge.

13. A wood overlay section as claimed in claim 1 wherein a finished height of said wood overlay section is substantially twenty-eight inches.

14. A wood overlay section for a carriage house garage door comprising:
- a section substructure including a first layer of sheet metal, a second layer of sheet metal, and a polystyrene foam board insulating core having first and second sides, said first layer of sheet metal being coupled to said first side of said a polystyrene foam board insulating core, and said second layer of sheet metal being coupled to said second side of said polystyrene foam board insulating core; and
- wood siding coupled to said first layer of sheet metal, said wood siding having a thickness in a range of 0.2 to 0.4 inches, and said wood siding being formed from a plurality of wood panels having tongue and groove joints to interlock said wood panels.

15. A wood overlay section as claimed in claim 14 wherein said wood overlay section includes a hot melt polyurethane adhesive for bonding said first layer of sheet metal to said first side of said polystyrene foam board insulating core and for bonding said second layer of sheet metal to said second side of said polystyrene foam board insulating core.

* * * * *